Sept. 3, 1935.   G. GORTON   2,013,492
BRAKE FOR ROTARY SPINDLE MACHINE TOOLS AND THE LIKE
Original Filed May 15, 1929   2 Sheets-Sheet 1
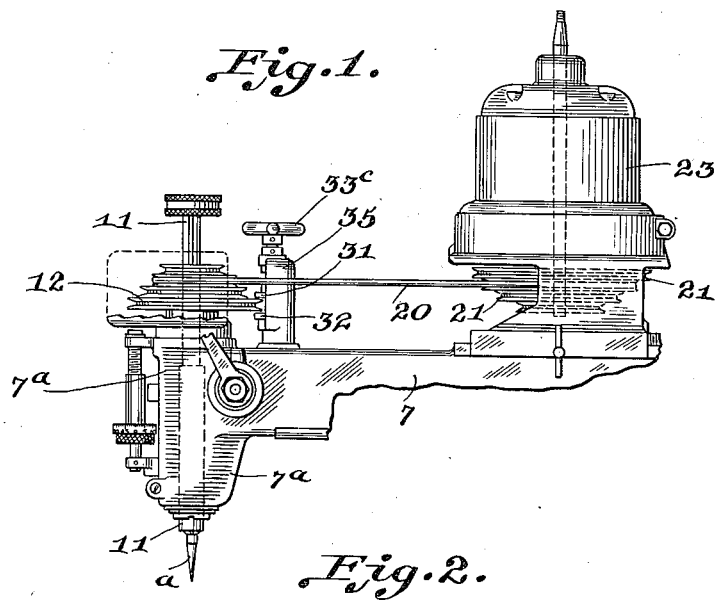
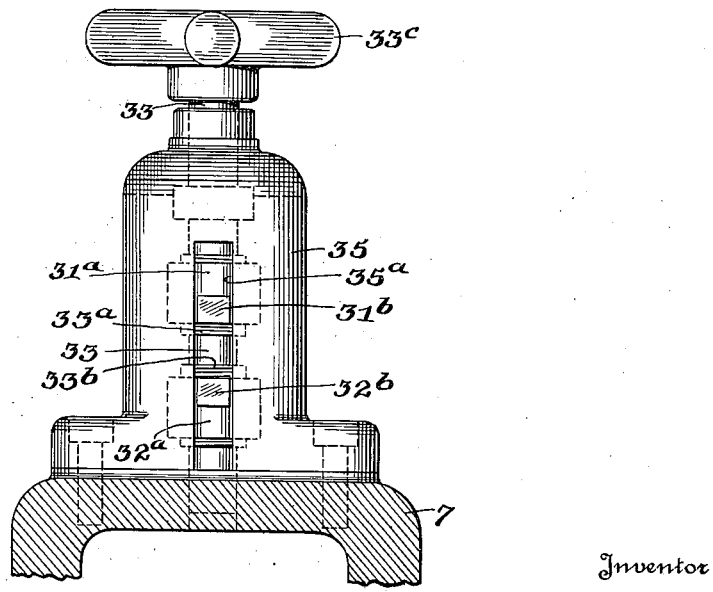
Inventor
George Gorton
By
Hubert E. Peck  Attorney Sept. 3, 1935. G. GORTON 2,013,492
BRAKE FOR ROTARY SPINDLE MACHINE TOOLS AND THE LIKE
Original Filed May 15, 1929 2 Sheets-Sheet 2

Inventor
George Gorton
By
Hubert T. Pick Attorney

Patented Sept. 3, 1935

2,013,492

UNITED STATES PATENT OFFICE 2,013,492

BRAKE FOR ROTARY SPINDLE MACHINE TOOLS AND THE LIKE

George Gorton, Racine, Wis.

Original application May 15, 1929, Serial No. 363,152. Divided and this application March 19, 1931, Serial No. 523,873

9 Claims. (Cl. 188—73)

This application is filed as a division of my application filed May 15, 1929, Ser. No. 363,152, for Routing, milling, and other machines.

This invention relates to rotary spindle machine tools and the like, such as, among others, routing, milling and other machines embodying a driven rotary spindle, such as a vertical spindle, and involves an advantageous organization and arrangement whereby the spindle rotating at high speed, can be quickly and efficiently stopped and locked, clamped or braked and thus held against rotation for cutter change or inspection, and can be as quickly released for rotation; and the objects and nature of the invention will be understood by those skilled in the art in light of the following explanations of the accompanying drawings that show the preferred mechanical expression or embodiment of the invention from among other forms, structures and arrangements within the spirit and scope of the invention.

A particular object of the invention is to provide machine and other tools having rotary driven spindles, with improved preferably manually-actuated means whereby such rotary parts can be clamped or held against rotation during cutter change or inspection or for other purposes, and quickly released, and whereby said rotary parts when rotating at high speed can be quickly and efficiently stopped with minimum shock and wear.

With the foregoing and other objects in view, my invention consists in certain novel features, and in combinations and cooperative arrangements, as more fully and particularly described and specified hereinafter.

Referring to the accompanying drawings, forming part hereof:—

Fig. 1 shows a machine tool embodying my invention, in side elevation, partially broken away.

Fig. 2 is a detail vertical cross section showing the clamp or brake organization in rear elevation.

Fig. 3 is an enlarged detail vertical section, parts being broken away.

Figure 5:
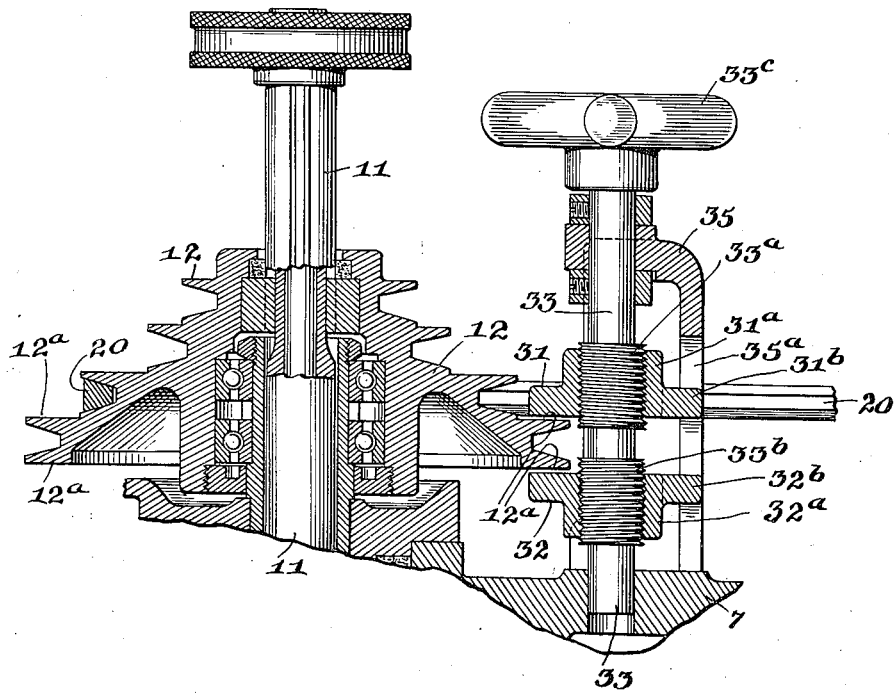

In the drawings, merely as one example from among others, of an application and embodiment of my invention, I show a machine for milling, routing or other purposes, wherein the high speed rotary spindle 11 at its lower end is equipped with a removable rotary cutter a. The lower end of the spindle is equipped with a chuck or other means for locking the removable cutter to and whereby it can be released from the spindle.

At its upper end, this vertical spindle 11, is equipped with a horizontally rotatable grooved pulley 12, whereby the spindle is rotated through the medium of horizontally arranged endless friction driving belt 20, extending to and fitting and driven by a suitable horizontally rotating grooved belt driving pulley 21. For instance, I show pulley 21, fixed on the lower end of the vertical rotary driven shaft of motor 23. In the example shown, the horizontally elongated slidable supporting member or machine head 7, at its front end forms a hollow vertical housing or cutter head 7a, through which the rotary spindle 11, extends with its upper end projecting above and its lower end projecting below said housing. This head 7a, encloses the barrel or bearings for the spindle. The spindle is usually mounted in and carried by a barrel slidable vertically in the head 7a, to feed the spindle cutter to and from the work. The spindle pulley 12, is usually splined to the spindle to rotate with and drive the spindle and to permit the spindle to slide vertically through the pulley. The pulley 12, is arranged above the head or member 7, as are the motor 23, its pulley 21, and the endless horizontal spindle driving belt 20.

It is desirable to provide a cutter spindle brake for high speed cutter spindles, to enable the operator to quickly stop the cutter spindle rotation and lock or clamp the spindle, for changing cutters or for other reasons, usually after the motor power current has been cut off. I show an easily accessible and easily operated quick acting brake for this purpose, that cooperates with the maximum diameter rim portion of the cutter spindle pulley. For instance, I show said rim portion of the pulley 12, formed with horizontal flat parallel top and bottom annular braking faces or surfaces 12a, and at the rear of said pulley, I arrange a pair of cooperating brake shoes or jaws 31, 32, arranged radially of the pulley and projecting forwardly above and below said side faces 12a, respectively, and movable mutually toward and from each other to grip and clear said faces to apply pulley stopping, clamping, holding or braking pressure and friction, or to release the pulley for free rotation. The jaw 31, forms a forward rigid projection of a vertically movable nut 31a, having a left screw thread, and the jaw 32, a corresponding projection rigid with a nut 32a, having a right hand screw thread, and these two nuts are threaded on a vertical rotary screw shaft 33, having a left hand screw thread 33a, for raising and lowering nut 31a, and a right hand screw thread 33b, for simultaneously forcing nut 32a, down or up in the opposite direction to the movement of nut 31a. The shaft 33, rises from the head 7, and at its lower end is mounted in a bearing hole in the top wall of the head, and at its upper end is mounted to revolve in and is held against substantial axial movement by, the upper end of a bracket 35, fixed to and rising from the top wall of head 7. The upper end of rotary screw shaft 33, is equipped with an accessible handle 33c, by which the shaft can be rotated to operate the jaws or brakes 31, 32, to quickly brake and stop the pulley and consequently the cutter spindle, or to quickly release said pulley.

The upstanding bracket 35, is vertically slotted at 35a, to slidably receive rearwardly projecting lugs 31b, 32b, rigid with the nuts 31a, 32a, respectively, to hold said nuts against rotation, while permitting free vertical movement of the nuts under the forcing power of the screw threaded portions of shaft 33.

In the example shown, the brake mechanism is mounted on the sliding head 7, to the rear of the pulley 12, between the widely separated opposite lengths of the driving belt 20, leading horizontally from the motor pulley to said spindle pulley, and said brake mechanism is also preferably located in the vertical plane of the longitudinal axis of the sliding head 7, which plane also includes the parallel longitudinal axes of the cutter spindle and the motor shaft.

When the easily accessible top handle 33c, has been rotated to cause the rapid clamping and gripping action of opposing jaws 31, 32, on the pulley rim, the screw threads serve to automatically lock and hold the jaws in clamping position, without requiring the operator to keep hold of the handle 33c, or otherwise use his hand to hold the brake in clamping position. Also, when the handle has been rotated to separate the two jaws and release the pulley 12, the screw threaded connections between shaft 33, and the two jaws, serve to automatically hold the jaws in separated inoperative position.

This brake or pulley clamping assembly, enables me to locate the same out of the way above head 7, and behind the pulley 12, and between and out of contact with the opposite separated horizontal lengths of belt 20, with the top handle 33c, easily and quickly accessible from the machine operator's stand.

The jaws 31, can be narrow, and the jaw operating means, take up a relatively narrow space, and hence the housing or bracket 35, can be narrow and relatively long vertically, hence there is ample room for the brake or clamping mechanism in the space between the belt lengths without having rubbing contact therewith. Furthermore, all parts of the brake mechanism are readily accessible and visible for inspection, cleaning, and replacement, and in fact, the brake mechanism is usually carried by a removable housing 35, which can be secured by bolts or machine screws to a machine frame or head in operative relation to a spindle driving pulley, such as 12.

The brake disclosed gains peculiar advantages in that it is directly applied to the cutter spindle driving element, in this example pulley 12, that concentrically receives and directly drives the cutter spindle, and hence directly applies the braking action to the pulley 12 and its spindle for approximately shockless quick stopping, while shock on the motor is obviated by slipping of the belt drive between the motor and pulley 12, and furthermore quick action is also gained by the comparatively long leverage of the substantial radial distance between the axis of the spindle and the rim portion of pulley 12, where the two brake shoes grip the pulley, and furthermore lateral strains on the pulley and spindle and on their mountings is avoided as the braking pressure is applied vertically parallel to the spindle axis, and as the pressure of one brake shoe is opposed by that of the other brake shoe and hence the pressure of one brake shoe is compensated by that of the other shoe in so far as approximate radial, lateral and longitudinal strains on the pulley axis are concerned, and I am enabled to accessibly locate the brake on the sliding head to the rear of pulley 12, and between the opposite belt lengths between the motor and pulley 12.

A further important advantage is gained by employing the brake to lock and clamp the pulley 12, splined to the cutter spindle, and thereby lock said spindle against rotation during the operation of changing cutters. Heretofore, it was usually necessary to hold the cutter spindle against rotation by gripping its pulley by hand, during the cutter changing operation. This is usually a dangerous procedure, frequently resulting in punctured and cut fingers. As an alternative some operatives drive a wooden wedge between head 7 and pulley 12, to lock or jam the pulley with possibility of machine damage.

In machines employing a rotary draw bar to tighten and loosen the cutter holding collet or chuck of the cutter spindle, it is necessary to hold the cutter spindle against rotation while thus manipulating said bar. In such machines, the advantages of a quick acting brake to cooperate with a number rotating with the cutter spindle to quickly lock and release the same and particularly to automatically hold the same locked when applied, are obvious.

I do not wish to limit all features of my invention to use of the spindle driving pulley as the member rotating with the spindle and with which the brake cooperates, nor to the particular formation shown to provide the braking surfaces that cooperate with the brake shoes, nor to whether or not the brake shoes and/or the cooperating braking surfaces are provided with friction or cushioning surfaces.

It is evident that various changes, modifications and departures might be resorted to without departing from the spirit and scope of my invention and hence I do not wish to limit my invention to the disclosure hereof except where required by the following claims construed as broadly as permitted by the prior art.

What I claim is:—

1. A brake assembly for locking and releasing the rotary cutter spindle of a machine tool through the medium of a concentric circular element rotating with said spindle, said assembly including a relatively fixed supporting and guiding housing, an accessible exterior manual controlling member, and quick-acting brake applying and releasing mechanism actuated by said controlling member, said mechanism being self-locking to maintain the brake in the position to which moved, whereby the operator has both hands free for cutter changing after moving said member to cause locking of the spindle against rotation.

2. A brake assembly for association with a horizontally disposed member rotating and concentric with a vertical rotary cutter spindle of a machine tool, for locking and releasing said member to hold said spindle against rotation during cutter replacement or manipulation; said assembly including upper and lower complementary jaws; a vertical operating shaft cooperating with said jaws to cause relative clamping and releasing movements, means being provided whereby said jaws are held in the positions to which moved; a bracket adapted to be fixedly located on the frame of such machine, and providing a vertical guiding retaining housing for said jaws open at one side for the cooperative arrangement of the marginal portion of said member between said jaws; and an operating handle for said shaft exposed and accessible beyond said bracket.

3. A brake assembly for association with a horizontally disposed member concentric and rotating with the vertical cutter spindle of a machine tool, to lock said spindle against rotation and to release the same; said assembly including a vertical bracket adapted to be fixedly located on the machine frame, said bracket providing a vertical guiding housing and a vertical top bearing; a vertical rotary shaft mounted in said bearing and extending longitudinally of said housing, and exteriorly of bracket provided with an operating handle; upper and lower right and left screw threaded nuts in and relatively movable longitudinally of and held against rotation by said housing and providing upper and lower complementary clamping jaws adapted to be located above and below the marginal portion of said member; and right and left screw threads arranged longitudinally of said shaft, and operatively meshing with said right and left nuts, respectively.

4. A brake assembly for association with a horizontally disposed member rotating and concentric with the rotary cutter spindle of a machine tool for locking said spindle against rotation during cutter adjustment or replacement; said assembly including a vertical bracket adapted to be fixed to the machine frame; complementary upper and lower jaws arranged in said bracket for relative opposite vertical movements, said bracket having an elongated vertical guiding slot, each jaw having a projecting portion to hold the jaw against rotation, confined in and slidable longitudinally of said slot, said bracket at one side exposing said jaws for operative association with said member with its rim portion between said jaws for locking and releasing on relative opposing movements between the jaws; a vertical shaft arranged longitudinally of the bracket and jaws, and rotatively mounted in the bracket against relative longitudinal movement and provided with manual operating means accessible exteriorly of the bracket; and right and left hand screw threaded jaw operating connections between the shaft and jaws.

5. A braking assembly for direct operative association, in a machine tool, with the maximum diameter annular portion of the horizontally-rotating driving pulley of the relatively longitudinally-movable rotary cutter spindle splined to said pulley, for quickly locking and releasing the same; said assembly adapted to be supported radially remote from and to the rear of said spindle by the machine frame; said assembly including opposing jaws separate from and for cooperating with said annular pulley portion, an accessible actuating handle adapted to be exposed at the exterior of said frame, and operating means from said handle to said jaws including quick acting self-locking meshing screw-threaded connections.

6. An assembly for quickly locking and releasing the depending rotary cutter spindle of a machine tool through the medium of a concentric circular element rotating with said spindle of the type substantially as described, said assembly embodying an exteriorly accessible handle; a vertical shaft actuated thereby; pulley clamping and releasing jaws controlled by said shaft; and a relatively fixedly supported confining and guiding housing for said jaws and shaft and open at one side for the operative association of said jaws with said element.

7. An assembly for quickly locking and releasing the rotary cutter spindle of a machine tool of the type specified through the medium of an enlarged diameter concentric element rotating with said spindle and normally held against relative longitudinal movement therewith, said assembly including a vertical housing relatively fixedly supported; upper and lower opposing relatively movable clamping jaws confined and guided by said housing; a vertical shaft arranged in said housing and provided with exterior operating means; and operating connections between said shaft and said jaws, respectively, said housing being open laterally for the co-acting arrangement of the rim portion of said element with and between said jaws.

8. An assembly for quickly locking and releasing the vertical rotary cutter spindle of a machine tool of the type specified through the medium of an enlarged diameter element concentric and rotating with said spindle and normally held against relative operative movement longitudinally thereof, said assembly including a relatively fixedly supported vertical housing; upper and lower relatively-movable right-and-left-hand screw threaded nuts confined by said housing and providing jaws cooperatively arranged with respect to said element to clamp and release the same, said housing being laterally open to permit the operative arrangement of said element between said jaws; and right-and-left-hand screw threaded operating means for actuating said nuts and jaws.

9. An assembly for quickly locking and releasing the vertical rotary cutter spindle of a machine tool through the medium of an element rotating and concentric with said spindle and having top and bottom marginal braking surfaces, said assembly including a housing relatively fixedly supported and providing a guideway; upper and lower alined members confined in said guideway and providing opposed jaws above and below said element to cooperate in clamping and releasing the same; and an operating shaft arranged longitudinally of said guideway and members and operatively coupled thereto and provided with an exterior accessible operating handle.

GEORGE GORTON.